June 10, 1947. H. W. SHERIDAN 2,422,139
HYDRAULIC REMOTE CONTROL SYSTEM
Filed July 1, 1943 2 Sheets-Sheet 1

INVENTOR.
Hiram W. Sheridan
BY Mann, Brown & Co.
ATT'YS

June 10, 1947.     H. W. SHERIDAN     2,422,139
HYDRAULIC REMOTE CONTROL SYSTEM
Filed July 1, 1943     2 Sheets-Sheet 2
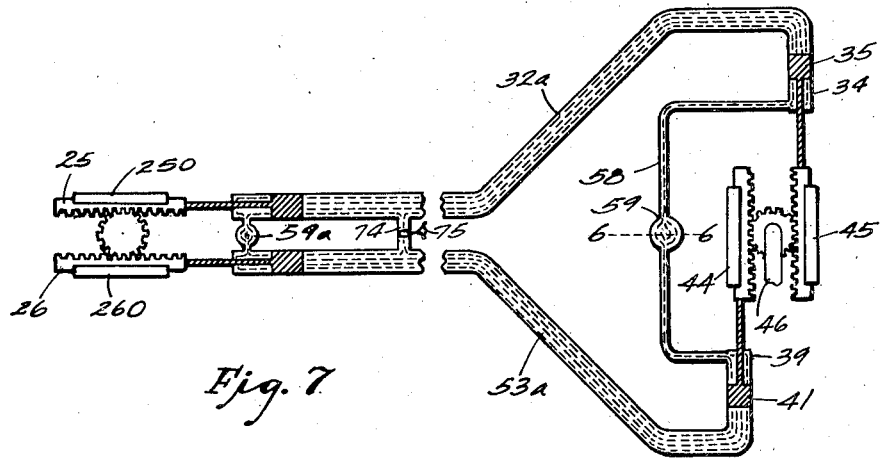
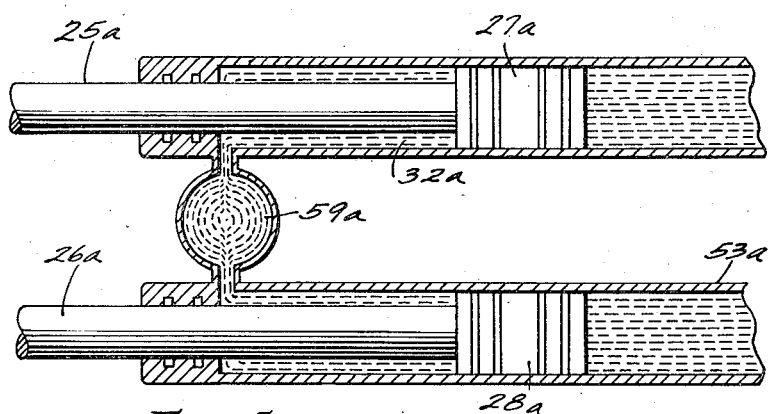
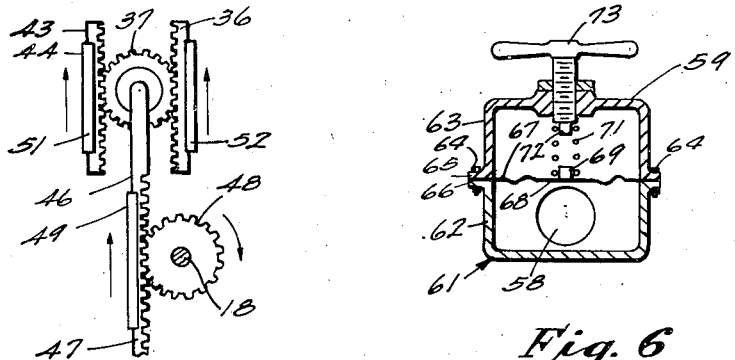
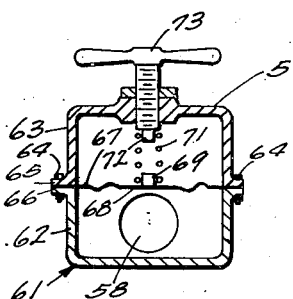
INVENTOR.
Hiram W. Sheridan
BY Mann, Brown & Co.
ATT'YS Patented June 10, 1947

2,422,139

UNITED STATES PATENT OFFICE 2,422,139

HYDRAULIC REMOTE CONTROL SYSTEM

Hiram W. Sheridan, Oak Park, Ill.

Application July 1, 1943, Serial No. 493,039

4 Claims. (Cl. 60—54.5)

This invention relates to hydraulically operated devices for the remote control of mechanism of various types.

The principal object of the invention is the provision of a new and improved hydraulic control device for operating various types of mechanism by remote control.

Another object of the invention is the provision of new and improved hydraulic control mechanism that has novel means for compensating for expansion and contraction of the hydraulic fluid without affecting the operation of the control mechanism.

A further object of the invention is the provision of new and improved hydraulic mechanism for operating remote controls effecting the directive movements of airplanes, dirigibles, and like vehicles, and that is substantially non-compressible and non-extensible.

A further object of the device is the provision of a remote control unit of the hydraulic type that is non-compressible and non-extensible under all temperature conditions, whereby the distance between the operating element and the operated or controlled member remains substantially constant at all times and under all conditions.

A further object of the invention is the provision of a remote control mechanism that is simple in construction, easily assembled and applied, and that is efficient in operation.

Other and further objects and advantages of the invention will appear from the following description, taken in connection with the accompanying drawings in which Fig. 1 is a perspective view of an aircraft showing the invention therein more or less diagrammatically;

Fig. 4 is a plan view of a portion of the device, shown more or less diagrammatically;

Fig. 5 is a horizontal section of a portion of the device, showing a modified construction;

Fig. 6 is a section on the line 6—6 of Fig. 7; and

Fig. 7 is a horizontal section of another portion of the device, showing a further modified construction.

In aerial transportion the vehicle is directed by means of elevators, ailerons, and a rudder. The control connections for these elements are of considerable length and usually have more or less give, elasticity or rubber effect while in use. Furthermore, the effect of heat and cold on these connections expands and contracts them and materially complicates this give and take or yielding movement. The present invention seeks to remedy these difficulties by the provision of liquid columns for transferring steering energy from the control levers to the control mechanism that is so constructed and arranged that these columns or connections are not affected by variations in temperatures to which they are continually subjected.

It is contemplated that the invention may be adapted to various remote control purposes including remote control for radios, cameras and other devices.

The invention is based on the concept of employing two separate hydraulic columns so related that while the two columns will cooperate for remote actuation, expansion and contraction of the fluid in the columns with changes in temperature will in effect cancel out without causing actuation. Such cancellation avoids inaccuracy or mal-functioning attributable to either changes in temperature or changes in environmental pressure.

Of the two hydraulic columns in one device, each is made to have the same volume as the other one, which is usually done by having all parts equal in dimensions and by having the fluid lines the same length, but the flexibility of the device is such that one pipe line can be made much shorter than the other if installation problems make it desirable. The difference in volume of one line with respect to the other line is adjusted by means of a small reservoir of controllable capacity, as with a metal plug, so that the volume of fluid in one line system can be made exactly equal to that in the other line system. If desirable, two reservoirs are used, one to each line.

To make the compensator work with precision two things are necessary. The volume of fluid in the system of the two lines should be equal, one to the other. Second, the two columns of fluid must be affected by the same changes of temperature. Ordinarily the two columns will naturally have the same temperature, and this is no problem, but it is well to bear in mind that, in a steel mill, for instance, one line should not be run in the red glare of a furnace, while the other is behind some thermal insulation.

Figure 1:
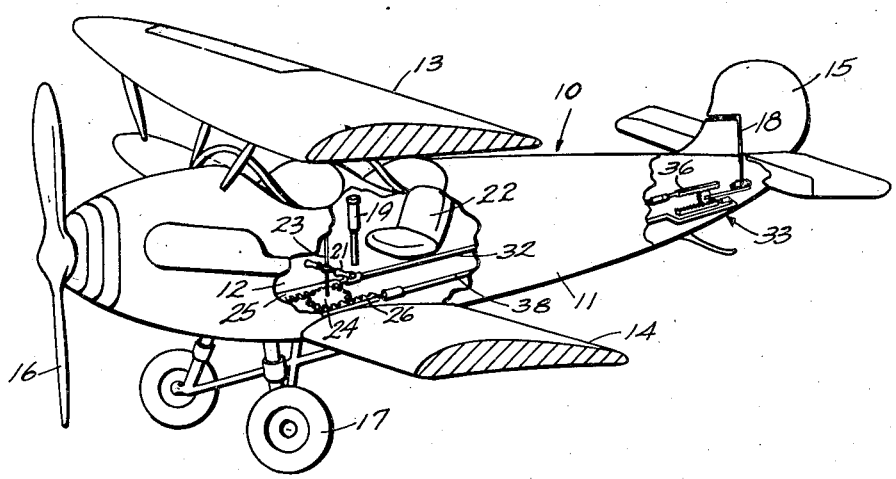

Referring now to the drawing, the reference character 10 designates an aircraft having the fuselage 11, the cockpit 12, the wings 13, 14, the rudder 15, propeller 16, and the landing gear 17. The rudder is pivoted to swing about a vertical axis 18, as shown in Fig. 1 of the drawing. The control stick is shown at 19, the rudder bar at 21, and the seat at 22. The invention is disclosed in connection with the control of the rudder, and will now be described.

As shown more particularly in Figs. 1 to 4 inclusive, the rudder staff 23, on which the rudder bar 21 is fixed, is provided at its lower end with a gear 24, which meshes with racks 25, 26, extending in the same direction and arranged at opposite sides of the gear 24. The rudder staff 23 is rotatably mounted in fixed pivots, and the racks 25, 26, are connected to pistons 27, 28, which reciprocate in cylinders 29, 31. The cylinder 29 is in communication at, what for convenience of description will be termed, its rear end, with a pipe or conduit 32, which extends at a distance to the compensating device or operating mechanism, shown generally by the reference character 33. The rear end of the conduit 32 is in communication with a cylinder 34, having a piston 35 therein, which is rigidly connected to a rack bar 36. The rack bar 36 meshes with a gear 37.

Figure 2:
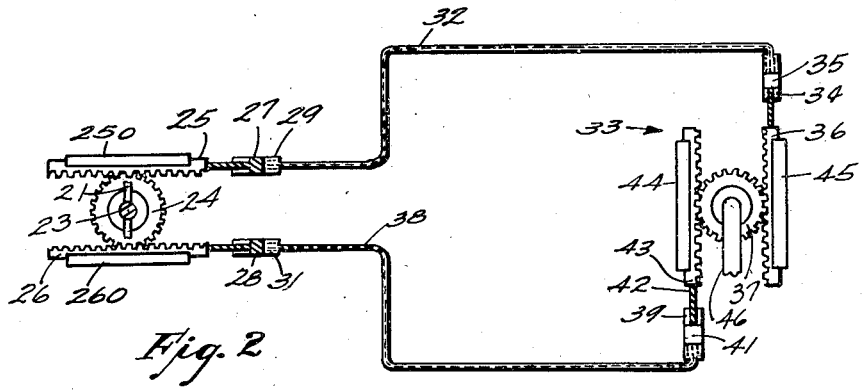
Fig. 2 is a diagrammatic view of the remote control mechanism, showing the same in neutral position.

The cylinder 31 is likewise in connection with a conduit or pipe 38, and this pipe is in communication at its rear end with a cylinder 39, corresponding to the cylinder 34; and mounted within this cylinder is a piston 41, having a rigid piston rod 42 to which a rack 43 is rigidly connected. The rack 43 is in mesh with the gear 37, on the opposite side from the rack 36, and extends in the opposite direction, as shown in Figs. 1 and 2. The rack bars are provided with guides 44, 45, for guiding their reciprocation.

The gear 37 is a floating gear, and is adapted to have not only a rotary motion but a motion of pure translation. Pivotally connected to the gear 37 is an actuating rod 46, Fig. 4, which has a rack 47 on its outer end. The rack 47 is in engagement with a gear 48, and this gear is mounted on the pivoted shaft 18 of the rudder 15. The rack 47 is provided with a suitable guide, as 49, and the racks 43 and 36 are provided with suitable guides 51, 52. Likewise the racks 25, 26, are provided with guides 250, 260. The conduits 32 and 38 may be of any suitable length, and are adapted to be filled with a liquid, preferably one that will not be affected by freezing weather.

Assuming now that the control apparatus is in the position shown in Figs. 1 and 2, and assuming that the temperature has increased materially, the liquid in the conduits 32 and 38 will expand, and since the racks 25, 26, are on the opposite side of the gear 24 and extend in the same direction, and since the gear is mounted on a shaft having fixed pivots, there will be no movement of the racks 25, 26, because they tend to rotate the gear 24 in opposite directions about a fixed pivot, and consequently the liquid cannot expand in that direction. Expansion of the liquid, however, will cause the pistons 35 and 41 to move outwardly in the cylinders, and since these pistons are arranged at opposite sides of the gear 37 and move in opposite directions they will merely rotate the gear 37 without in any way affecting a translating movement of the gear 48.

Figure 3:
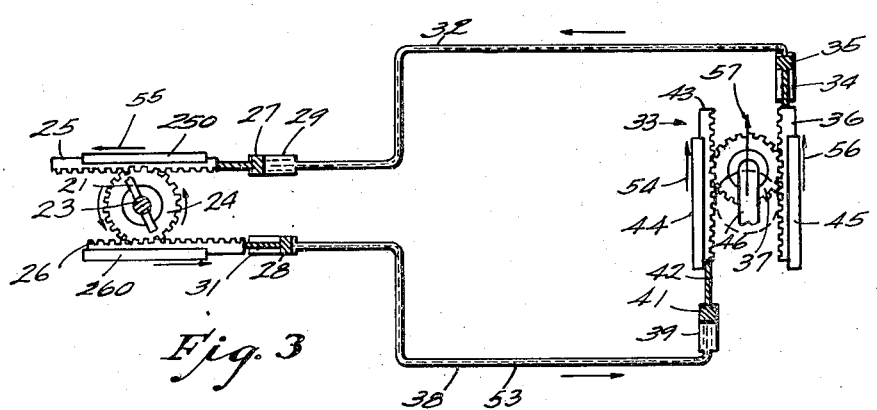
Fig. 3 is a similar view of the mechanism, showing the same after it has been operated.

Assume, now, that the rudder bar 21 is rotated left-handed, this will cause the rack bar 26 (see Fig. 1) to move rearwardly, and this in turn will cause the liquid column 53 in the conduit 38 to move rearwardly, and this in turn will cause the piston 41 to move upwardly, as shown in Fig. 3, in the direction of the arrow 54 in said figure. This movement will also move the piston 27 (see Fig. 3) in the cylinder 29 to the left in the direction of the arrow 55 in said figure. When the piston 27 moves to the left it will create a partial vacuum, and the air pressure on the outer end of the piston 35 will force it and the rack 36 upwardly in said figure, in the direction of the arrow 56. Since both the rack bars 43 and 36 are moved upwardly, they will carry the floating gear 37 upwardly without rotating it, from the dotted line position shown in Fig. 3 to the full line position shown therein in the direction indicated by the arrow 57 in this figure.

The movement of the gear 37 from the dotted line to the full line position will move the rackbar 46 upwardly in Fig. 4, and this in turn will rotate the gear 48 on the rudder bar 18, thereby moving the rudder 15 to the left as viewed from the rear of the aircraft. By rotating the shaft 23 in the opposite direction, the rudder may be moved to the right. It will thus be seen that the expansion or contraction of the liquid in the conduits will compensate or equalize each other, and that this compensating movement will not affect the operation of the rudder.

The force applied by the inward movements of the pistons 35 and 41 for moving the racks 36 and 43 inwardly is limited to the air pressure at the particular elevation at the time the mechanism is operated. In order to render the device independent of air pressure in its operation, the following mechanism may be employed.

The outer or adjacent ends of the cylinders 34 and 39 are connected by a conduit or passage 58, having a compensating device 59 inserted therein, Fig. 7. The compensating device is inserted at any suitable point in the conduit 58 and is intended for compensating for the increase in volume of the liquid in the conduit 58, due to increase in temperature. As shown, an annular box member or compensating casing 61 is provided, to the walls of which the adjacent ends of the conduit 58 are rigidly secured, as shown in Fig. 6. The box member 61 is provided with a bottom section 62, and a top section 63, which are connected together in any suitable manner, as by means of bolts 64 engaging flanges 65, 66, on the upper and lower sections of the box. Clamped between the flanges 65, 66, is a yieldable diaphragm, such as a corrugated steel plate 67. The diaphragm has a rigid plate 68 adjacent its central portion, and the plate has an upwardly extending stud 69 which constitutes a guide for a spring 71, the lower end of which surrounds the stud 69 and the upper end of which engages about a reduced portion 72 or an adjusting screw 73 threaded thru the upper wall of the box member 61. The tension of the spring 71 may be adjusted by means of the screw 73.

The plate or diaphragm 67 is stiff but resilient and the spring 71 is also very stiff so that it takes a very large force to cause the diaphragm and spring to yield for increasing the volume of the compensating casing. The expansive force of the fluid being tremendous, the parts will yield to compensate for this expansion but will function more or less like a rigid member for transmitting force from one piston to the other. It will thus be seen that when the bar 23 is rotated counterclockwise, and the piston 41 is forced upwardly, it will force the liquid in the passage 58 upwardly in Fig. 7, and this in turn will force the piston 35 upwardly the same amount. By increasing the pressure on the diaphragm 67 with the inner end of the screw 73, almost any pressure desired may be applied to the outer end of the piston 35 for moving the same.

In Fig. 5 is shown a modified form of construction in which the leakage past the pistons 27a and 28a may be prevented, or at least compensated for, and this is accomplished by the provision of a casing member 59a which is similar to the casing member 59 shown in Fig. 6. This casing member 59a may be termed a reservoir, and is filled with a liquid which may be maintained under pressure at all times by any suitable means known to the art (not shown). Should any of the liquid leak past the piston rods or rack bars that form piston rods 25a, 26a, the liquid under pressure in the reservoir 59a will compensate for this leakage.

It is desirable that the conduit 32a and 53a maintain a constant relative amount of the liquid, and in order to insure this equilibrium a cross-over conduit 74, having a valve 75 therein, may be provided. When the device is in neutral position, as shown in Fig. 7, the valve 75 is in closed position. Should some of the liquid leak out from either the conduit 32a or 53a, the valve may be opened and the device reset to neutral position, that is, the pistons 35 and 41 are moved to the proper position, after which the valve 75 is again closed.

While in the constructions disclosed a rack and pinion is shown for converting reciprocating into rotary motion, it is understood that any of the mechanical devices conventionally employed for this purpose may be used.

The type of fluid employed will be selected for desired results. Low friction fluid, such as alcohol, may be used when viscosity of the fluid is the major consideration. In applications such as the control of airplanes, where very low temperatures are encountered, the oil now in current use, and known to the trade as Sperry fluid or similar composition, could be used. Where damping against oscillations is most desired, a fluid of heavier viscosity would be employed. Where seepage is the major consideration, a fluid that does not leak through small openings would be utilized.

Expansion of a fluid column can be compensated for by the use of a reservoir or fluid container attached thereto. The volumetric content of the reservoir may be controlled by the action of a thermostat, so adjusted that the expansion of the hydraulic column through a rise of temperature would be compensated for by a corresponding increase in the volumetric content of the reservoir, thus taking sufficient fluid out of the column to maintain the column always at even length.

It is thought from the foregoing, taken in connection with the accompanying drawings, that the operation and construction of my device will be apparent to those skilled in the art, and that changes in size, shape, proportion and details may be made without departing from the spirit and scope of the appended claims.

I claim as my invention:

1. In a control device, an operating member comprising a gear rotatable about a fixed axis, an operated member comprising a gear adapted to rotate and having a motion of pure translation, a pair of hydraulic columns between said members, a cylinder at each end of said columns, a piston in each cylinder, a rack connected to each piston, the racks at the inner ends of said columns being parallel and extending in the same direction and the racks at the outer ends of said columns being parallel and extending in opposite directions, whereby when said hydraulic columns expand they will cause the rotation of the outer gear only and when said inner gear is rotated in either direction it will cause the outer gear to move in a plane parallel to said outer racks, and a passage between the outer ends of each pair of cylinders for assisting in preventing leakage past the pistons in said cylinders.

2. In a control device, an operating member comprising a gear rotatable about a fixed axis, an operated member comprising a gear adapted to rotate and having a motion of pure translation, a pair of hydraulic columns between said members, a cylinder at each end of said columns, a piston in each cylinder, a rack connected to each piston, the racks at the inner ends of said columns being parallel and extending in the same direction and the racks at the outer ends of said columns being parallel and extending in opposite directions, whereby when said hydraulic columns expand they will cause the rotation of the outer gear only and when said inner gear is rotated in either direction it will cause the outer gear to move in a plane parallel to said outer racks, a passage connecting the outer ends of the outer cylinders, a resilient diaphragm for yieldingly increasing the capacity of said passage, and means for varying the stiffness of said diaphragm.

3. In a control system, an operating member movable in opposite directions for opposite control effects, a first pair of cylinders enclosing a first pair of pistons connected to said operating member to move in opposite directions in response to movement of said operating member in one of its directions, a floating rotary operated member, a second pair of cylinders enclosing a second pair of pistons operatively connected with said operated member to cause translation of the operated member in response to simultaneous movement of said second pair of pistons in one direction and to cause rotation of the operative member in response to simultaneous movement of said second pistons in opposite directions, two hydraulic columns operatively interconnecting said two pairs of cylinders to cause said second pair of pistons to move in the same direction in response to movement of the first pair of pistons in opposite directions and cause the second pair of pistons to move oppositely in response to fluid expansion by temperature changes in the two hydraulic columns, and means providing hydraulic communication between outer faces of at least some of said pistons to minimize fluid leakage from said two hydraulic columns.

4. A control system as set forth in claim 3 in which said means providing hydraulic communication includes means providing hydraulic communication between the two outer faces of said first pair of pistons, and separate means providing hydraulic communication between the outer faces of said second pair of pistons.

HIRAM W. SHERIDAN.

REFERENCES CITED

The following references are of record in the file of this patent:

UNITED STATES PATENTS

| Number | Name | Date |
|---|---|---|
| 375,674 | Greene | Dec. 27, 1887 |
| 1,716,121 | Giffen | June 4, 1929 |
| 2,205,046 | Nardone | June 14, 1940 |
| 2,297,610 | Giers | Sept. 29, 1942 |
| 2,308,048 | Brown | Jan. 12, 1943 |
| 2,315,270 | Palmer | Mar. 30, 1943 |
| 1,716,121 | Giffen | June 4, 1929 |
| 1,864,236 | Evrard | June 21, 1932 |
| 2,175,800 | Hodgman | Oct. 10, 1939 |
| 1,935,004 | Winther | Nov. 14, 1933 |
| 1,881,266 | Giers | Oct. 4, 1932 |

FOREIGN PATENTS

| Number | Country | Date |
|---|---|---|
| 519,099 | Great Britain | Mar. 15, 1940 |
| 752,390 | France | July 17, 1933 |
| 776,645 | France | Nov. 8, 1934 |
| 803,441 | France | July 6, 1936 |